(12) United States Patent
Friesen

(10) Patent No.: US 8,479,911 B2
(45) Date of Patent: Jul. 9, 2013

(54) MOVABLE CONVEYOR FOR LOADING A CONTAINER

(75) Inventor: Henry Friesen, Winkler (CA)

(73) Assignee: Convey-AU Industries Inc., Winkler, MB (CA)

( * ) Notice: Subject to any disclaimer, the term of this patent is extended or adjusted under 35 U.S.C. 154(b) by 139 days.

(21) Appl. No.: 13/214,884

(22) Filed: Aug. 22, 2011

(65) Prior Publication Data

US 2013/0048465 A1    Feb. 28, 2013

(51) Int. Cl.
*B65G 15/60* (2006.01)
*B65G 15/26* (2006.01)

(52) U.S. Cl.
USPC ........ 198/313; 198/314; 198/316.1; 198/318; 414/488

(58) Field of Classification Search
USPC ........... 198/313, 314, 315, 316.1, 318, 550.2, 198/550.9, 550.13, 581; 414/488, 502, 527
See application file for complete search history.

(56) References Cited

U.S. PATENT DOCUMENTS

| | | | | |
|---|---|---|---|---|
| 3,154,189 | A * | 10/1964 | O'Hanlon et al. | 198/311 |
| 4,058,198 | A * | 11/1977 | O'Neill et al. | 198/313 |
| 4,669,945 | A * | 6/1987 | Pollard et al. | 414/505 |
| 5,090,550 | A * | 2/1992 | Axmann | 198/313 |
| 6,471,031 | B1 * | 10/2002 | Duncalf | 198/311 |
| 7,267,519 | B2 | 9/2007 | Cresswell | |
| 7,296,676 | B2 * | 11/2007 | Smith et al. | 198/861.4 |
| 7,428,956 | B2 * | 9/2008 | Scherman | 198/312 |
| 7,488,149 | B2 | 2/2009 | Waldner | |
| 7,500,814 | B2 | 3/2009 | Meyer | |
| 7,946,416 | B2 * | 5/2011 | Grose et al. | 198/671 |
| 8,272,494 | B2 * | 9/2012 | Zazula et al. | 198/313 |
| 8,317,013 | B2 * | 11/2012 | Sanders | 198/667 |

FOREIGN PATENT DOCUMENTS

CA    2257048    6/2000

* cited by examiner

*Primary Examiner* — Mark A Deuble
(74) *Attorney, Agent, or Firm* — Adrian D. Battison; Ade & Company Inc.

(57) ABSTRACT

A container for example for a seeder includes a filling conveyor mounted on one with a bottom hopper and an upper filling spout with the conveyor being movable in a direction inwardly and outwardly relative to the side of the container to different positions relative to the container for cooperation with a supply. This is achieved by mounting the conveyor on a swivel coupling at the outer end of an arm which can be raised and lowered by pivotal movement about an inner end at the container. The hopper is supported on two pairs of ground wheels, each pair being arranged on a respective side of the hopper for supporting the respective side and each pair comprising a respective one of a pair of castor wheels mounted at respective ends of a pivotal beam extending along the respective side of the hopper and pivotal about an axis transverse to the hopper.

19 Claims, 6 Drawing Sheets

MOVABLE CONVEYOR FOR LOADING A CONTAINER

This invention relates to an apparatus including a conveyor movable to allow a hopper of the conveyor to be moved to positions to cooperate with a supply vehicle for loading a tank.

BACKGROUND OF THE INVENTION

The loading of the tank of a seeder has become more difficult in recent years due to the increase in size of the container or tank, due to the difficulty of reaching the loading opening of the tank and due to the current use of belly-dump trailers rather than the conventional lift trailer.

Various arrangements have been used to resolve this problem and many seeder tanks now carry a loading mechanism in the form of a conveyor which is mounted on a suitable mounting assembly at the side of the tank. Generally the conveyor duct is mounted at the end of an arm which can swivel side to side about a vertical axis and the duct itself can also swivel about a pin at the end of the arm so that the location of the hopper at the lower end of the duct can be manoeuvred to different positions.

Examples of these are shown in:

Canadian Patent 2,257,048 (Lisafeld) originally published on 30 Jun. 2000 which shows an air seeder tank with an auger tube attached to one side of the tank for pivotal movement about a vertical axis allowing a hopper at the lower end of the auger tube to be moved to a position underneath a supply vehicle.

U.S. Pat. No. 7,267,519 (Cresswell) assigned to Bourgault originally published on 27 Oct. 2005 which shows a similar arrangement in which the hopper at the lower end is hinged about a transverse axis to fold to a retracted position on top of the auger tube.

U.S. Pat. No. 7,500,814 (Mayer) assigned to Deere originally published on 12 Apr. 2007 which shows a similar arrangement in a hydraulic positioning system is provided to move the auger tube to a required position.

U.S. Pat. No. 7,488,149 (Waldner) assigned to Decker Colony Farms originally published on 21 Aug. 2006 which shows a swing arm which carries and manipulates the auger tube.

Other arrangements have been proposed to carry out this function but they are very expensive including providing conveyors mounted on the supply vehicle itself. These have generally not been satisfactory.

The disclosures of the above published documents are incorporated herein by reference or may be referred to for further details of components not fully disclosed herein.

SUMMARY OF THE INVENTION

It is one object of the invention to provide an improved filling system for a container such as a seeder tank in which a conveyor is movable to allow a hopper of the conveyor to be moved to positions to cooperate with a supply vehicle.

According to one aspect of the invention there is provided conveyor apparatus for transporting particulate material from a supply discharge to an inlet of a container, the apparatus comprising:

a conveyor duct having an opening at an inlet end and a discharge end;

an endless belt mounted in the conveyor duct and engaged by a lower roller at the opening at the inlet end so that an upper run of the belt passes the opening and carries the material along the duct;

a feed duct attached to the inlet end of the conveyor duct;

the feed duct including a top opening with a hopper attached thereto to guide material from the supply discharge into the top opening;

an endless belt mounted in the feed duct and engaged by a lower roller at a lower end and an upper roller at an upper end so that an upper run of the belt passes the opening and carries the material along the feed duct;

the feed duct being movable between a retracted stored position and a deployed position;

in the deployed position the feed duct extending outwardly from the inlet end of the conveyor duct and arranged such that the upper end discharges into the top opening of the conveyor duct;

the feed duct being mounted by a guide track mounted on the conveyor duct and extending longitudinally along the conveyor duct for movement of the feed duct longitudinally of the feed duct between the deployed position and the retracted stored position;

the guide track being arranged to carry the feed duct from the deployed position into the retracted stored position on a top of the conveyor duct.

Preferably the guide track is arranged to maintain the feed duct as it moves in a direction longitudinal of the conveyor duct so that in the deployed position the feed duct lies in a common axial plane with the conveyor duct. To further control this longitudinal movement, preferably the feed duct is carried at its outer end on a ground engaging wheel fixed for longitudinal movement of the feed duct in the direction longitudinal of the conveyor duct. Preferably the ground engaging wheel is carried on arms extending outward from the outer end of the feed duct.

As the conveyor duct needs to move to different locations relative to air seeder tank, the conveyor duct is preferably carried at its outer end on a ground engaging wheel, such as a castor wheel, which is rotatable about an upright axis for allowing movement of the outer end of the conveyor duct in different directions. The castor wheel preferably is a carried on a suspension for up and down movement and has a larger tire to support the whole structure during its movement carried on a pivotal support from the air seeder tank allowing movement of the outer end in different directions.

Preferably the hopper extends substantially along the full length of the feed duct since this is intended to be located under a vehicle to receive the material from the discharge opening.

Preferably the guide track includes a pair of parallel track portions each arranged on a respective side of conveyor duct and the feed duct includes a pair of guide roller assemblies each on a respective side of the feed duct and each cooperating with a respective one of the track portions. This construction accurately guides the feed duct in its longitudinal movement. In order to hold the feed duct against twisting, preferably each guide roller assembly includes a pair of longitudinally spaced rollers.

In order to allow the feed duct to pivot upwardly and downwardly as it is deployed in the longitudinal direction, each guide roller assembly is preferably pivotally connected to a respective side of the feed duct for up and down pivotal movement of the feed duct about a common transverse axis across the conveyor duct.

Preferably each track portion includes a down turned end portion arranged to allow the inner end of the feed duct to drop downwardly as it moves into the deployed position and to be lifted upwardly as it is moved out of the deployed position.

Preferably there is provided a drive cylinder for moving the feed duct along the conveyor duct.

Preferably the feed duct includes a pair of downwardly extending support legs each arranged for engaging onto a respective one of the track portions in the retracted position to hold the feed duct in the retracted position.

Preferably the feed duct has its own hydraulic drive motor for driving the one of the upper and lower rollers thereof.

Preferably the conveyor duct has a row of openings along the top of the conveyor duct.

Preferably the conveyor duct includes a cylindrical portion which cups the belt.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
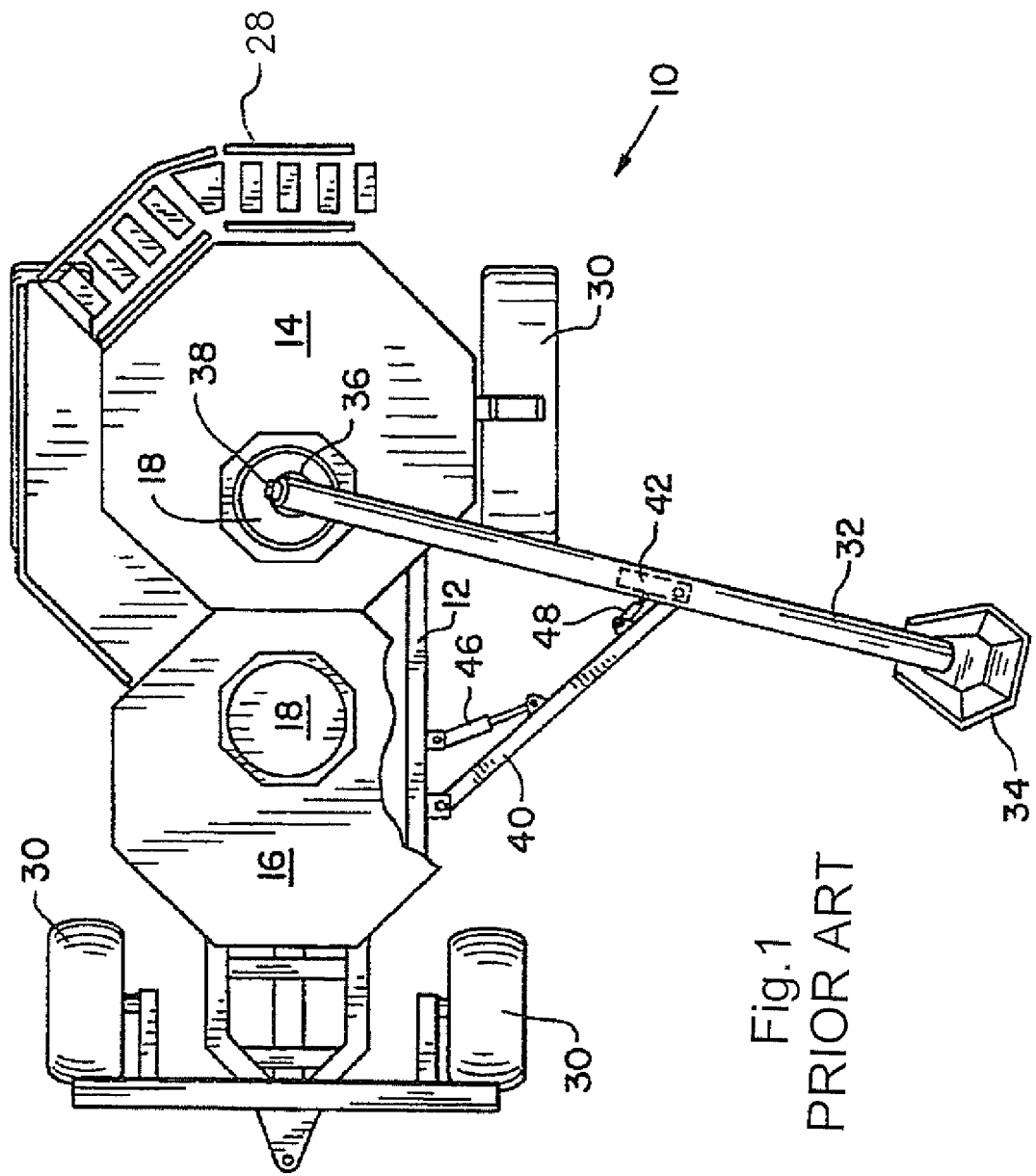
FIG. 1 is a top plan view of a conveyor apparatus for mounting on the side of a seeder tank for loading the tank from a supply vehicle.

In FIG. 1, which is taken from U.S. Pat. No. 7,500,814 cited above to show the construction of air cart with which the present invention can be used, there is shown an embodiment of an agricultural material handling implement in the form of an air cart 10 for use with an air seeder. The air cart 10 typically is pulled behind a tillage implement (not shown) including a number of openers for forming parallel seed trenches in the soil in which the seeds are deposited in known manner. The air cart 10 may also be configured to be pulled in front of the tillage implement by a traction unit such as a tractor (not shown).

Although configured as an air cart in the embodiment shown, the agricultural implement may also be in the form of a different type of implement which carries a material which can by conveyed, such as a gravity wagon, planter, etc.

The air cart 10 generally includes one or more tanks which hold a material to be deposited in the seed trenches formed in the soil, such as seed and/or fertilizer. In the embodiment shown, air cart 10 includes a first tank 14 and second tank 16. First tank 14 and second tank 16 each include an inlet 18 for receiving material, and an outlet at the bottom for discharging material to a pneumatic distribution system (not visible) also carried by frame 12. The pneumatic distribution system includes a centrifugal fan which blows air at a predetermined flow rate and pressure through air distribution lines to the tillage implement ahead of air cart 10.

The frame 12 also carries a stair and walkway 28, wheels 30 and conveyor 32. In the embodiment shown, conveyor 32 which is primarily used to load material into tanks 14 and 16, but may also be used to unload material remaining within tanks 14 and 16 after planting is complete. The conveyor 32 includes an inlet 34 in the form of a loading hopper, an outlet 36 in the form of an unloading chute.

The conveyor 32 is generally moveable in three primary directions, i.e., toward and away from frame 12, up and down, and in a rotational direction about a generally vertical axis. To that end, a first arm 40 is pivotally coupled with frame 12. The outboard end of first arm 40 is moveable toward and away from frame 12 through the pivotal action, and is itself pivotally coupled with a second arm 42. Cylinders 46 and 48 control the movement and positioning of the conveyor 32.

Turning now to FIGS. 2 to 6, there is shown an alternative conveyor apparatus for transporting the seeds and fertilizer material from a supply discharge of the vehicle to the inlet of a tanks 14 and 16.

This apparatus uses the more desirable belt conveyor system which avoids the damaging effect of augers which can occur with some seeds.

This apparatus comprises a conveyor duct 40 and a feed duct 41 having a hopper 43 for feeding into an opening 42 in the conveyor duct.

The conveyor duct 40 includes endless belt 44 mounted in the conveyor duct and engaged by a spring tensioned lower roller 45 at the opening 42 at the inlet end 46 so that an upper run of the belt 43 passes the opening 42 and carries the material along the duct 40 to an upper end. The belt flattens over the roller 45 and then enters a cylindrical portion 47 of the duct 40 which cups the belt to improve transport of the seeds. The conveyor duct has a row of openings 42A, 42B along the top of the conveyor duct.

The feed duct 41 is attached to the inlet end 46 of the conveyor duct 40 and includes a top opening 48 dropping the material onto the flat belt 49 which is wrapped around rollers 50 and 51. The upper roller 51 is driven by a hydraulic motor 52 from hydraulic fluid supplied by the tractor and used to drive also the belt 44 through a motor (not shown). The hopper 43 defines guide walls 43A on respective sides and an end wall 43B at one end of the opening and is attached to the feed duct to guide material from the supply discharge into the top opening 48. The hopper extends substantially along the full length of the feed duct so that it is designed to fit under the discharge opening of the vehicle while the conveyor duct extends upwardly away from the vehicle to carry the material to the tank inlet opening. A drive cylinder 70 is provided for moving the feed duct along the conveyor duct.

The endless belt 49 passes the opening and carries the material along the feed duct to a discharge over the end roller 51. The feed duct 41 is movable between a retracted stored position shown in FIGS. 4 and 5 and a deployed position shown in FIGS. 2 and 3. In the deployed position of FIG. 5, the feed duct extends directly outwardly from the inlet end of the conveyor duct in a common line therewith with the inner or upper discharge end at the roller 51 arranged to discharge into the top opening 42 of the conveyor duct 40.

The feed duct 41 is mounted by a guide track formed by two guide track portions 52 and 53 mounted on respective sides of the conveyor duct. These are formed by or carried on a frame of the conveyor duct which provides structural strength of the conveyor duct and holds the rollers and the guides for the belt as a common structural member for common movement and against twisting. The guide track portions 52 and 53 and extend longitudinally along the conveyor duct and support the feed duct for movement of the feed duct longitudinally of the feed duct between the deployed position and the retracted stored position.

The parallel track portions 52, 53 are each arranged on a respective side of conveyor duct 40 and cooperate with a pair of guide roller assemblies 54, 55 each on a respective side of the feed duct and each cooperating with a respective one of the track portions. Each guide roller assembly 54, 55 includes a pair of longitudinally spaced rollers 56, 57 carried on a bracket 58. Each bracket 58 includes a rearwardly extending arm 59 which connects at a pivot 60 to a respective side frame 61, 62 of the feed duct. Thus each bracket 58 of its respective guide roller assembly 54, 55 is pivotally connected to a respective side of the feed duct for up and down pivotal movement of the feed duct about a common transverse axis at the pivot connection 60 across the conveyor duct 40.

Figure 4:
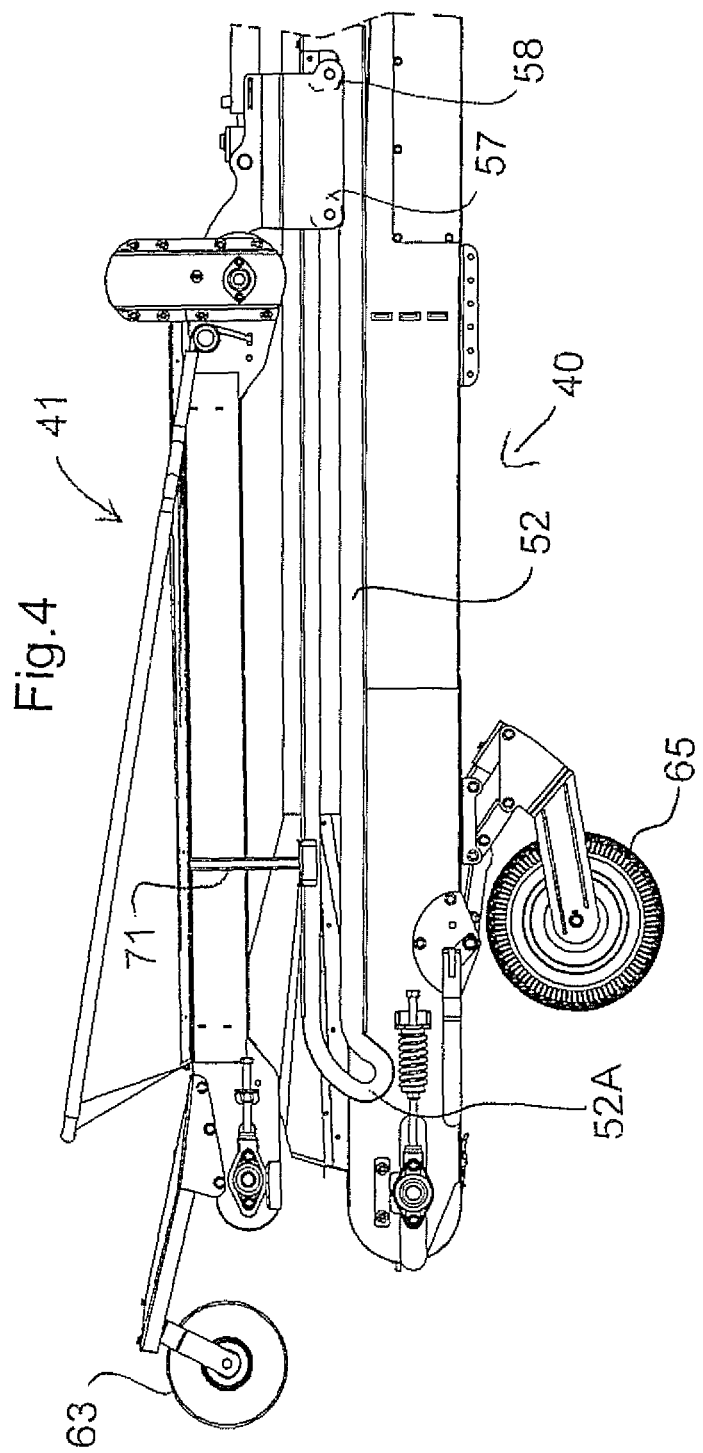
FIG. 4 is a side elevational view of the conveyor of FIG. 2 showing the feed duct in the retracted position.

As best shown in FIG. 4, each track portion 52, 53 includes a down turned end portion 52A arranged to allow the inner end of the feed duct and particularly the roller 57 to drop downwardly as it moves into the deployed position and to be lifted upwardly as it is moved out of the deployed position.

Figure 2:
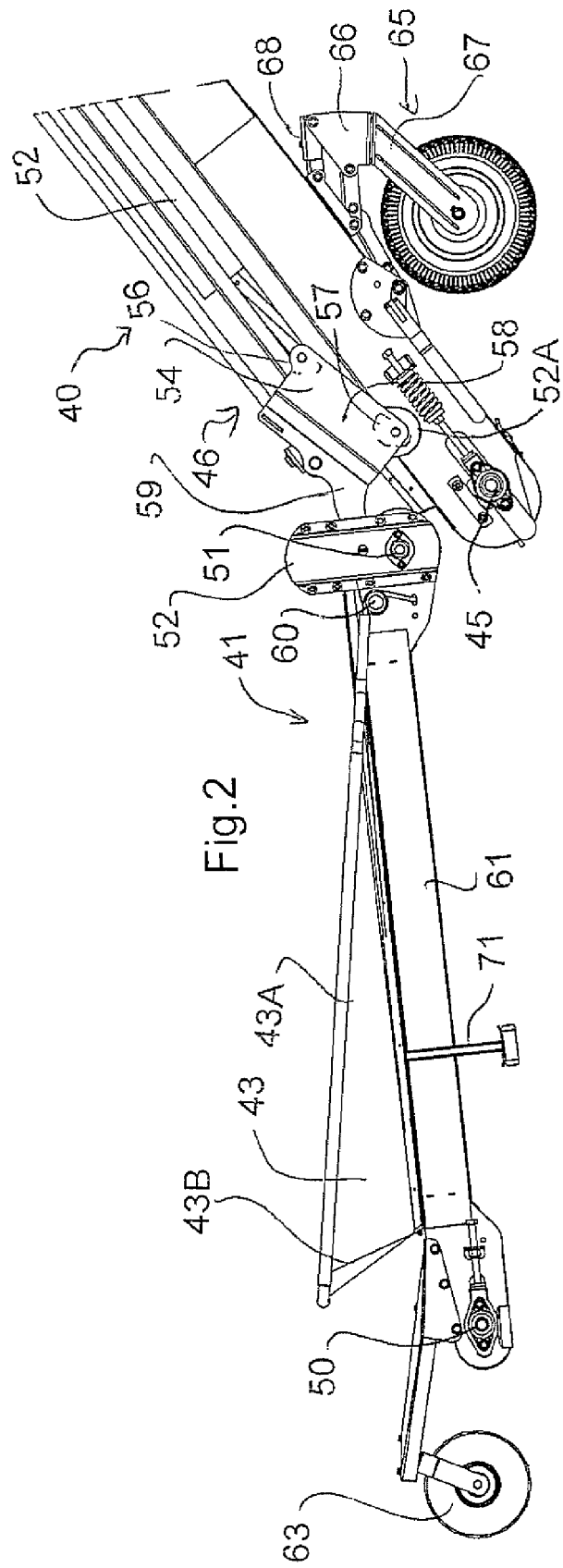
FIG. 2 is a side elevational view of a conveyor according to the present invention showing the feed duct in the deployed position.
Figure 3:
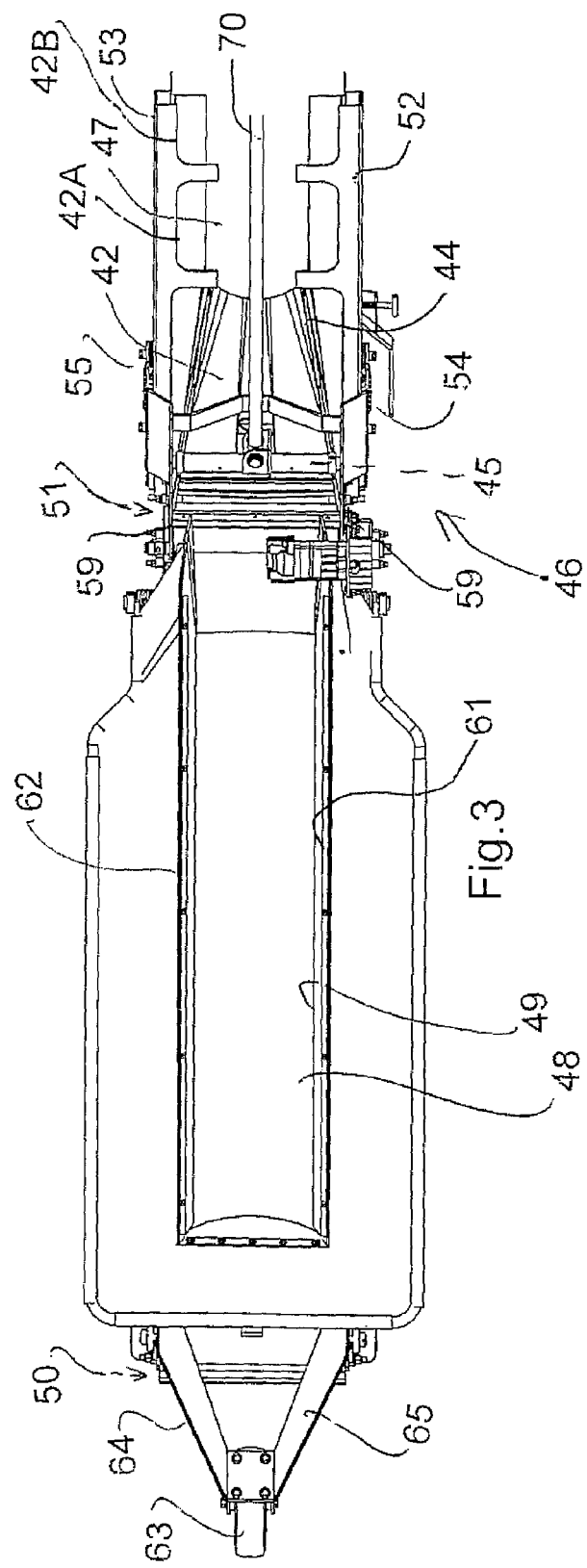
FIG. 3 is a top plan view of the conveyor of FIG. 2.
Figure 5:
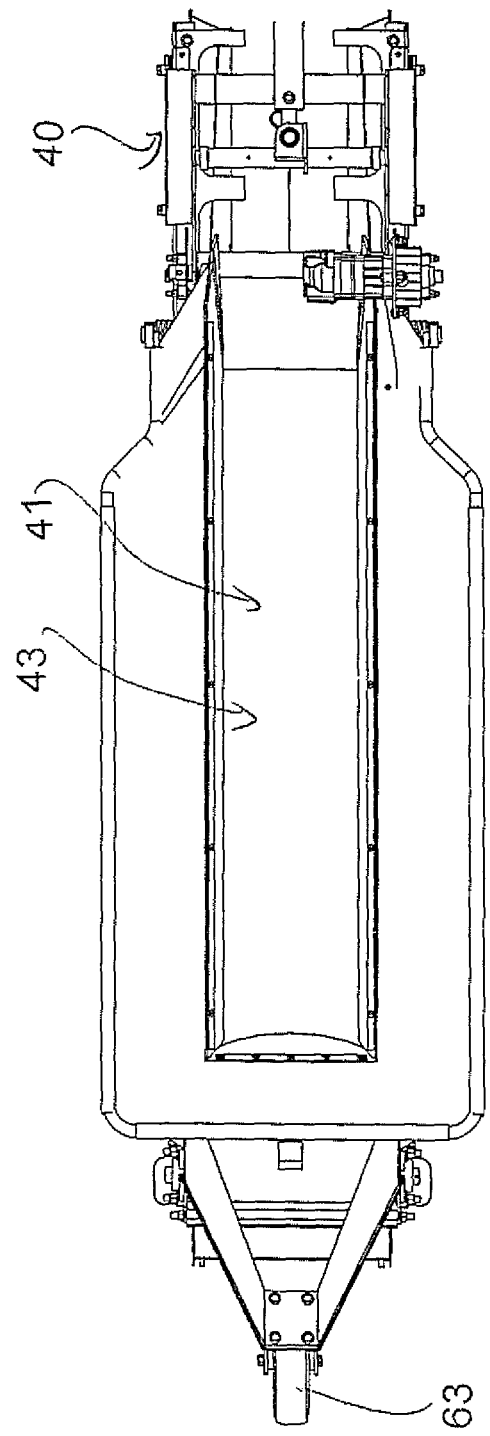
FIG. 5 is a top plan view of the conveyor of FIG. 2 shown in the position of FIG. 4.
Figure 6:
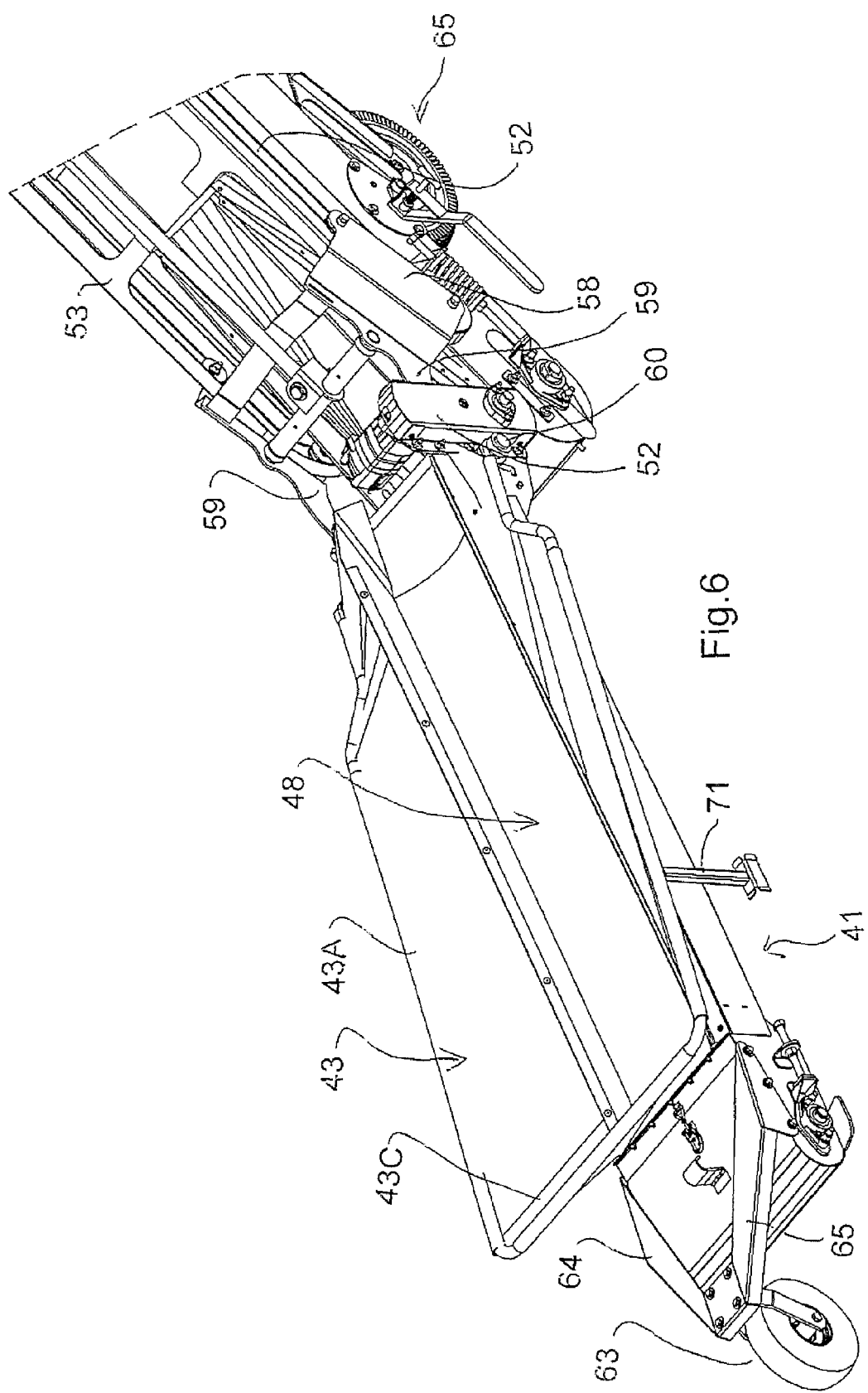
FIG. 6 is an isometric view of the conveyor of FIG. 2.

The guide track 52, 53 is thus arranged to carry the feed duct 41 from the deployed position, shown in FIGS. 2 and 3, outward beyond the end of the conveyor duct and aligned therewith into the retracted stored position, shown in FIGS. 4 and 5, on a top of the conveyor duct.

The guide track defined by the portions 52 and 53 together with the pivot coupling at 69 which connects to the sides of the of the feed duct 41 acts to maintain the feed duct 41 fixed against pivoting side of side or twisting as it moves in a direction longitudinal of the conveyor duct so that in the deployed position the feed duct lies in a common axial plane with the conveyor duct.

The feed duct is carried at its outer end on a ground engaging wheel 63 fixed for longitudinal movement of the feed duct 41 in the direction longitudinal of the conveyor duct so that as the feed duct is guided by the track it is also rolled outwardly by the wheel. The ground engaging wheel 63 is carried on fixed arms 64, 65 extending outward from the outer end of the feed duct and inclined together to the wheel at the center f the duct frame.

The conveyor duct is also carried at its outer end on a ground engaging wheel 65 which is a castor wheel carried on a hub 66 mounted on a four bar link suspension 68 for up and down movement. Thus the conveyor duct is carried on the pivotal support 40, 42 previously described allowing movement of the outer end in different directions while the castor wheel also moves to accommodate those movements.

For more effectively supporting the feed duct in the retracted position, the feed duct includes a pair of downwardly extending support legs 71 each arranged for engaging onto a respective one of the track portions 52, 53 respectively to hold the feed duct in the retracted position.

The invention claimed is:

1. A conveyor apparatus for transporting particulate material from a supply discharge to an inlet of a container, the apparatus comprising:
    a conveyor duct having an opening at an inlet end and a discharge end;
    an endless belt mounted in the conveyor duct and engaged by a lower roller at the opening at the inlet end so that an upper run of the belt passes the opening and carries the material along the duct;
    a feed duct attached to the inlet end of the conveyor duct;
    the feed duct including a top opening with a hopper attached thereto to guide material from the supply discharge into the top opening;
    an endless belt mounted in the feed duct and engaged by a lower roller at a lower end and an upper roller at an upper end so that an upper run of the belt passes the opening and carries the material along the feed duct;
    the feed duct being movable between a retracted stored position and a deployed position;
    in the deployed position the feed duct extending outwardly from the inlet end of the conveyor duct and arranged such that the upper end discharges into the top opening of the conveyor duct;
    the feed duct being mounted by a guide track mounted on the conveyor duct and extending longitudinally along the conveyor duct for movement of the feed duct longitudinally of the feed duct between the deployed position and the retracted stored position;
    the guide track being arranged to carry the feed duct from the deployed position into the retracted stored position on a top of the conveyor duct.

2. The apparatus according to claim 1 wherein the guide track is arranged to maintain the feed duct as it moves in a direction longitudinal of the conveyor duct so that in the deployed position the feed duct lies in a common axial plane with the conveyor duct.

3. The apparatus according to claim 2 wherein the feed duct is carried at its outer end on a ground engaging wheel fixed for longitudinal movement of the feed duct in the direction longitudinal of the conveyor duct.

4. The apparatus according to claim 3 wherein the ground engaging wheel is carried on arms extending outward from the outer end of the feed duct.

5. The apparatus according to claim 1 wherein the conveyor duct is carried at its outer end on a ground engaging wheel which is rotatable about an upright axis for allowing movement of the outer end of the conveyor duct in different directions.

6. The apparatus according to claim 5 wherein the ground engaging wheel of the conveyor duct is a castor wheel.

7. The apparatus according to claim 5 wherein the ground engaging wheel of the conveyor duct is a carried on a suspension for up and down movement.

8. The apparatus according to claim 1 wherein the conveyor duct is carried on a pivotal support allowing movement of the outer end in different directions.

9. The apparatus according to claim 1 wherein the hopper extends substantially along the full length of the feed duct.

10. The apparatus according to claim 1 wherein the guide track includes a pair of parallel track portions each arranged on a respective side of conveyor duct.

11. The apparatus according to claim 10 wherein the feed duct includes a pair of guide roller assemblies each on a respective side of the feed duct and each cooperating with a respective one of the track portions.

12. The apparatus according to claim 11 wherein each guide roller assembly includes a pair of longitudinally spaced rollers.

13. The apparatus according to claim 11 wherein each guide roller assembly is pivotally connected to a respective side of the feed duct for up and down pivotal movement of the feed duct about a common transverse axis across the conveyor duct.

14. The apparatus according to claim 11 wherein each track portion includes a down turned end portion arranged to allow the inner end of the feed duct to drop downwardly as it moves into the deployed position and to be lifted upwardly as it is moved out of the deployed position.

15. The apparatus according to claim 1 wherein there is provided a drive cylinder for moving the feed duct along the conveyor duct.

16. The apparatus according to claim 1 wherein the feed duct includes a pair of downwardly extending support legs each arranged for engaging onto a respective one of the track portions in the retracted position to hold the feed duct in the retracted position.

17. The apparatus according to claim 1 wherein the feed duct has a hydraulic drive motor for driving the one of the upper and lower rollers thereof.

18. The apparatus according to claim 1 wherein the conveyor duct has a row of openings along the top of the conveyor duct.

19. The apparatus according to claim 1 wherein the conveyor duct includes a cylindrical portion which cups the belt.

* * * * *